US012585234B2

(12) United States Patent
Zhao et al.

(10) Patent No.: US 12,585,234 B2
(45) Date of Patent: Mar. 24, 2026

(54) METHOD FOR ASSOCIATING ACTIONS FOR INTERNET OF THINGS, ELECTRONIC DEVICE AND STORAGE MEDIUM

(71) Applicant: BOE TECHNOLOGY GROUP CO., LTD., Beijing (CN)

(72) Inventors: Yanqiu Zhao, Beijing (CN); Junjie Zhao, Beijing (CN); Qian Zhang, Beijing (CN); Jing Su, Beijing (CN); Xinan Wang, Beijing (CN); Shaobei Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 437 days.

(21) Appl. No.: 17/921,295

(22) PCT Filed: Apr. 19, 2021

(86) PCT No.: PCT/CN2021/088062
§ 371 (c)(1),
(2) Date: Oct. 25, 2022

(87) PCT Pub. No.: WO2021/218681
PCT Pub. Date: Nov. 4, 2021

(65) Prior Publication Data
US 2023/0188602 A1 Jun. 15, 2023

(30) Foreign Application Priority Data
Apr. 26, 2020 (CN) .......................... 202010339968.2

(51) Int. Cl.
*G05B 15/02* (2006.01)
*G16Y 40/10* (2020.01)
(Continued)

(52) U.S. Cl.
CPC .............. *G05B 15/02* (2013.01); *G16Y 40/10* (2020.01); *H04L 67/12* (2013.01); *H04N 5/76* (2013.01);
(Continued)

(58) Field of Classification Search
None
See application file for complete search history.

(56) References Cited

U.S. PATENT DOCUMENTS

2012/0288124 A1 11/2012 Fejzo et al.
2014/0241354 A1 8/2014 Shuman et al.
(Continued)

FOREIGN PATENT DOCUMENTS

CN 102882752 A 1/2013
CN 104297965 A 1/2015
(Continued)

OTHER PUBLICATIONS

European Patent Office, Extended European Search Report, Jun. 14, 2024, Appl'n No. EP21795691.1.
(Continued)

*Primary Examiner* — Umar Cheema
(74) *Attorney, Agent, or Firm* — HOUTTEMAN LAW LLC

(57) ABSTRACT

The present disclosure provides a method for associating actions for Internet of things, an electronic device, and a computer-adable storage medium, the method includes: triggering a first device to execute a first action, and triggering a second device to execute a second action to obtain a feedback result of the first action and a feedback result of the second action, where each feedback result includes at least one of an execution result or an execution effect; and judging whether the first action and the second action are associable with each other based on the feedback result of the first
(Continued)

action and the feedback result of the second action; and in response to that the first action and the second action are associable with each other, associating the first action with the second action.

15 Claims, 11 Drawing Sheets

(51) Int. Cl.
| | |
|---|---|
| *H04L 67/12* | (2022.01) |
| *H04N 5/76* | (2006.01) |
| *H04N 7/18* | (2006.01) |
| *H04N 23/11* | (2023.01) |
| *H04N 23/61* | (2023.01) |

(52) U.S. Cl.
CPC .............. *H04N 7/188* (2013.01); *H04N 23/11* (2023.01); *H04N 23/61* (2023.01)

(56) References Cited

U.S. PATENT DOCUMENTS

| | | | |
|---|---|---|---|
| 2017/0034281 A1 | 2/2017 | Jung | |
| 2017/0155703 A1* | 6/2017 | Hao ........................ | H04W 4/70 |
| 2017/0310549 A1* | 10/2017 | Nagesh .............. | H04L 41/0895 |
| 2019/0024926 A1 | 1/2019 | Kim | |
| 2019/0034701 A1 | 1/2019 | Kerger | |
| 2019/0379733 A1 | 12/2019 | Huang | |
| 2020/0125829 A1 | 4/2020 | Cox et al. | |

FOREIGN PATENT DOCUMENTS

| | | | |
|---|---|---|---|
| CN | 104375418 | A | 2/2015 |
| CN | 104965503 | A | 10/2015 |
| CN | 106790588 | A | 5/2017 |
| CN | 107957687 | A | 4/2018 |
| CN | 108234408 | A | 6/2018 |
| CN | 108733005 | A | 11/2018 |
| CN | 109445292 | A | 3/2019 |
| CN | 109799852 | A | 5/2019 |
| CN | 110659361 | A | 1/2020 |
| CN | 109799852 | B | 2/2020 |
| CN | 110912900 | A | 3/2020 |

OTHER PUBLICATIONS

China Patent Office, First Office action, May 11, 2024, Appl'n No. CN202010339968.2.

China Patent Office, Second Office action, Jun. 5, 2024, Appl'n No. CN202010339968.2.

China Patent Office, Third Office action, Jul. 24, 2024, Appl'n No. CN202010339968.2.

Korean Patent Office, First Office Action, Sep. 11, 2025, for corresponding KR application No. 10-2022-7041153.

Koh et al., "Quiver: Using Control Perturbations to Increase the Observability of Sensor Data in Smart Buildings," Jan. 27, 2016, DOI: 10.48550/arXiv.1601.07260, <arXiv:1601.07260v1 [cs.SY] Jan. 27, 2016> last visited on Nov. 13, 2025.

* cited by examiner

METHOD FOR ASSOCIATING ACTIONS FOR INTERNET OF THINGS, ELECTRONIC DEVICE AND STORAGE MEDIUM

CROSS-REFERENCE TO RELATED APPLICATIONS

The present disclosure claims the priority to Chinese patent application No. 202010339968.2, filed on Apr. 26, 2020, the contents of which are incorporated herein by reference in their entirety.

TECHNICAL FIELD

The present disclosure relates to the field of internet of things (IoT) technology, and in particular, to a method for associating actions for Internet of things, an electronic device, and a storage medium.

BACKGROUND

An action triggering is a public service function provided by a service platform, and a service logic may be realized on the platform without performing a link check or control by an application, so that an amount of message transmission is reduced, and efficiency and intelligence are improved. The application may safely sleep or roam after deploying the service to the service platform.

However, in the related art, since there is no logical relationship between actions, when an action is executed, if an execution effect of the action is relatively poor or the action cannot be executed, another action having a similar function with the action cannot be triggered to achieve a desired action effect, which results in relatively poor robustness and insufficient intelligence of a system.

SUMMARY

In a first aspect, an embodiment of the present disclosure provides a method for associating actions for Internet of things, including:

triggering a first device to execute a first action, triggering a second device to execute a second action, acquiring a feedback result of the first action and a feedback result of the second action, the feedback result including at least one of an execution result or an execution effect; and judging whether the first action and the second action are associable with each other based on the feedback result of the first action and the feedback result of the second action, and in response to that the first action and the second action are associable with each other, associating the first action with the second action.

In some implementations, the judging whether the first action and the second action are associable with each other based on the feedback result of the first action and the feedback result of the second action and in response to that the first action and the second action are associable with each other, associating the first action with the second action includes:

judging whether the execution result of the first action is the same as the execution result of the second action;

in response to that the execution result of the first action is the same as the execution result of the second action, associating the first action with the second action; and in response to that the execution result of the first action is different from the execution result of the second action, acquiring the execution effect of the first action and the execution effect of the second action, and judging whether the execution effect of the first action is the same as the execution effect of the second action; and in response to that the execution effect of the first action is the same as the execution effect of the second action, associating the first action with the second action.

In some implementations, the acquiring the execution effect of the first action and the execution effect of the second action includes:

acquiring the execution result of an action result object corresponding to the first action and the execution result of an action result object corresponding to the second action according to a preset acquisition interval and an acquisition mode; and calculating to obtain the execution effect of the first action and the execution effect of the second action according to the execution result of the action result object corresponding to the first action and the execution result of the action result object corresponding to the second action.

In some implementations, the calculating to obtain the execution effect of the first action and the execution effect of the second action according to the execution result of the action result object corresponding to the first action and the execution result of the action result object corresponding to the second action includes:

calculating result data corresponding to the first action and result data corresponding to the second action according to the execution result of the action result object corresponding to the first action and the execution result of the action result object corresponding to the second action; and judging whether the result data corresponding to the first action and the result data corresponding to the second action meet a preset action condition to obtain the execution effect of the first action and the execution effect of the second action.

In some implementations, the associating the first action with the second action includes:

judging whether the second action meets a preset association condition of the first action according to the association condition; and in response to that the second action meets the association condition, associating the first action with the second action.

In some implementations, the association condition includes at least one of a position of a device, a type of the device, an operation time, or an operation priority.

In some implementations, the associating the first action with the second action includes:

associating the first action with the second action based on a preset mode for associating actions.

In some implementations, the preset mode for associating actions includes one of sequentially executing the actions, simultaneously executing the actions, or an abnormality of an action triggering an associated action to execute.

In a second aspect, an embodiment of the present disclosure provides an electronic device, including a memory, a processor and a computer program stored in the memory and being executable on the processor, the processor, when executing the program, implements the method for associating actions for Internet of things described above, the memory is configured to store data including at least one of an acquisition interval, an acquisition mode, an execution result, an execution effect, result data, an action condition, an association condition and a mode for associating actions.

In a third aspect, an embodiment of the present disclosure provides a computer-readable storage medium having stored thereon computer instructions for causing a computer to execute the method for associating actions for Internet of things described above.

DRAWINGS

In order to more clearly illustrate technical solutions in embodiments of the present disclosure, drawings for illustrating the embodiments will be briefly described below, it is obvious that the drawings in the following description only show some embodiments of the present disclosure, and other drawings may be obtained by those skilled in the art according to these drawings without inventive effort, in the drawings.

DETAILED DESCRIPTION

To make objects, technical solutions and advantages of the present disclosure more apparent, the present disclosure will be described in further detail below with reference to embodiments and the accompanying drawings.

It is to be noted that technical terms or scientific terms used in the embodiments of the present disclosure should have a general meaning as understood by one having ordinary skill in the art to which the present disclosure belongs, unless otherwise defined. The use of "first," "second," and the like in the present disclosure is not intended to indicate any order, quantity, or importance, but rather is used to distinguish one element from another. The word "comprises/ comprising" or "includes/including", and the like, means that the element or item appearing in front of the word contains the element or item listed after the word, and the equivalent thereof, but does not exclude other elements or items. Terms "Connect/connecting" and similar terms are not limited to physical or mechanical connections, but may include electrical, communication, and other connections, whether direct or indirect. Positional relationship terms such as "upper/on" and the like are used only to indicate relative positional relationships that may change accordingly when an absolute position of an object being described changes.

Figure 1:
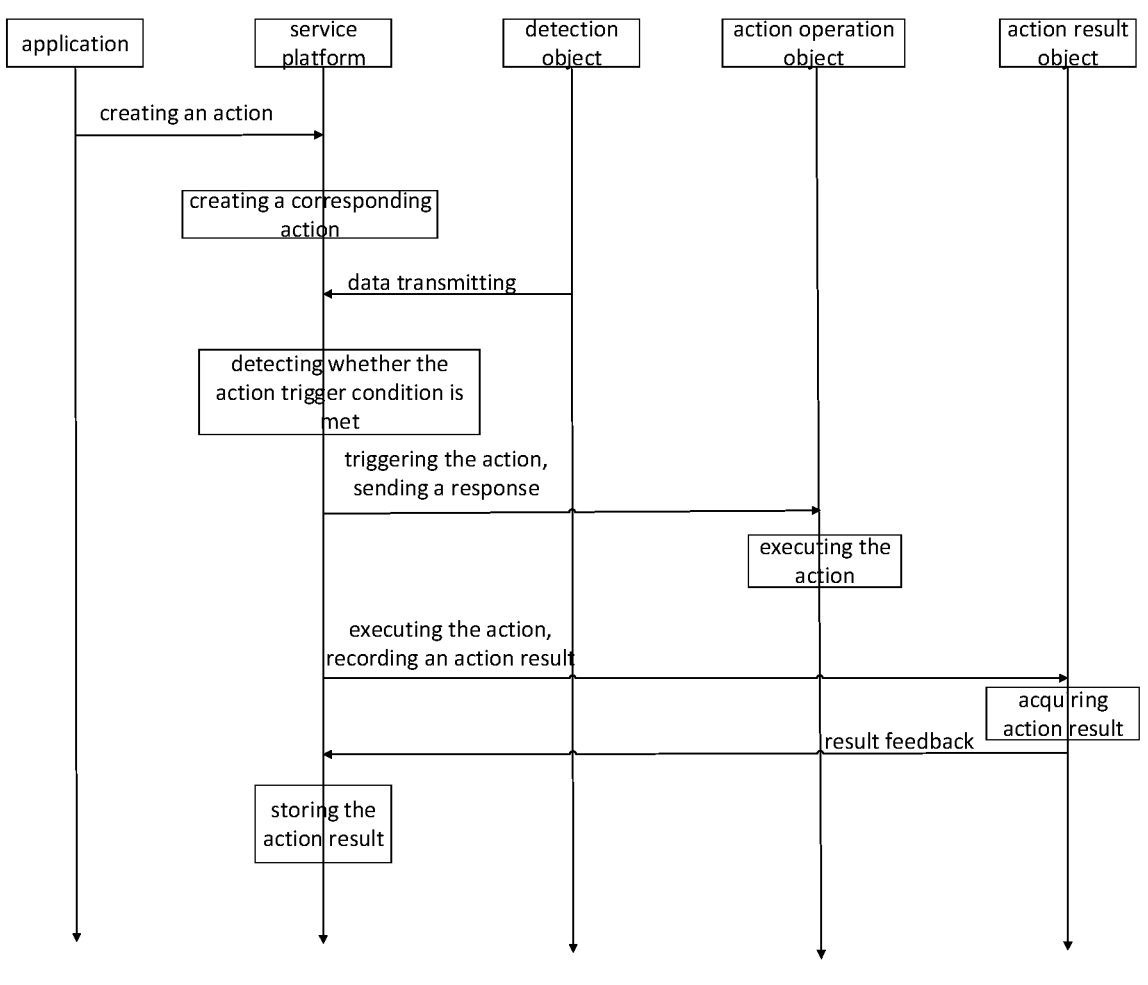
FIG. 1 is a schematic flowchart of triggering an action by a service platform.

A process of creating an action mainly includes: an application initiates a request to a service platform to create an action and related resources on the service platform, the resources are desired to include an action detection object, an action trigger condition, an action execution content, an action execution result, and the like. After the service platform completes the creation of the action, as shown in FIG. 1, the service platform triggers the action, monitors the action detection object, judges whether the action trigger condition is met, and if the action trigger condition is met, the service platform triggers the action, sends a corresponding instruction to an action operation object to enable the action operation object to execute the action; and acquires and records the action execution result through an action result object.

In the related art, a mode for associating actions is as follows: after a certain action is triggered by a condition, another device is also linked to operate, for example, a smoke sensor triggers alarm information of a mobile phone, and simultaneously may further relate to buzzing of an alarm and flashing of a warning light, in such mechanism for triggering actions, multiple actions may be triggered by one trigger condition, but there is no logical relationship between multiple actions to be triggered by trigger conditions that are not exactly the same. In an actual application sense, there may be multiple actions that have the same or similar functions, and during an action being executed, even the execution effect of the action is relatively poor, the execution effect that is desired to be achieved cannot be achieved by triggering another action with the similar function.

The method for associating actions for Internet of things according to the present disclosure associates the actions with the same execution effect or the same execution result, and can start a second action associated with a first action in response to that the first action fails to execute or the execution effect of the first action is relatively poor due to other situations, so that the execution effect of the action is ensured, and the robustness and the intelligence of the system are improved.

Figure 2:
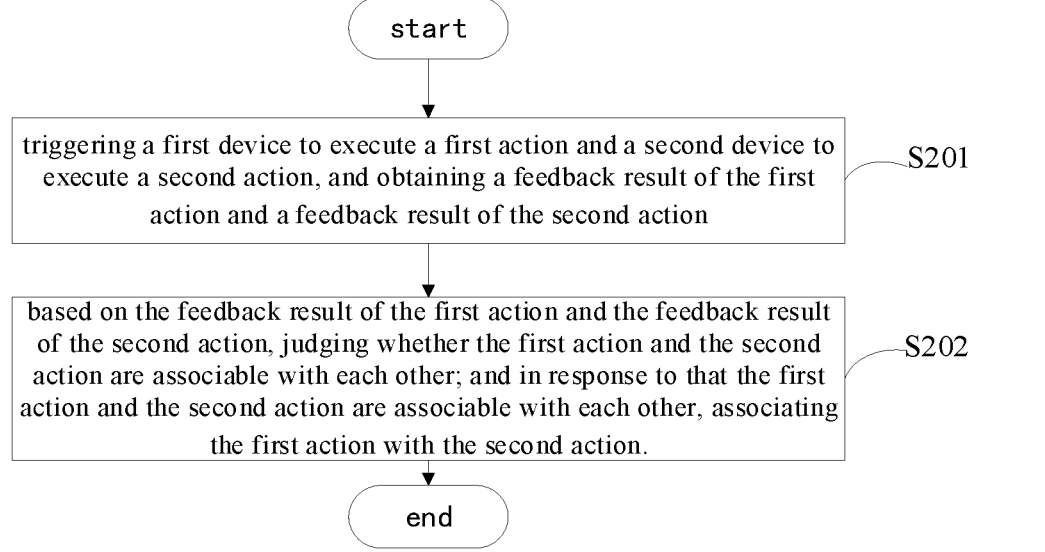
FIG. 2 is a schematic flowchart of a method for associating actions for Internet of things according to an embodiment of the present disclosure.

As shown in FIG. 2, an embodiment of the present disclosure provides a method for associating actions for Internet of things, applied to a service platform, including following steps S201 and S202.

At step S201, triggering a first device to execute a first action, and triggering a second device to execute a second action, and acquiring a feedback result of the first action and a feedback result of the second action.

After an application creates the first action and the second action on the service platform, the service platform triggers the first device to execute the first action and triggers the second device to execute the second action, so that the feedback result of the first action and the feedback result of the second action are obtained. The service platform may trigger the first device to execute the first action and the second device to execute the second action simultaneously, or may trigger the first device to execute the first action and the second device to execute the second action in sequence, which is not limited in the present disclosure.

After the service platform triggers any device to execute corresponding action, and corresponding feedback result may be received. In the embodiment of the present disclosure, the feedback result may include at least one of an execution result or an execution effect, the execution result may be an instantaneous state of the action result object such as capturing an image, opening a door, or alarming, and the execution effect may be a state change, in a duration, of the action result object such as reducing an indoor temperature, increasing an indoor temperature, or reducing an indoor concentration of carbon monoxide (CO).

At step S202, based on the feedback result of the first action and the feedback result of the second action, judging whether the first action and the second action are associable with each other; and in response to that the first action and the second action are associable with each other, associating the first action with the second action.

The service platform judges whether feedback results of the first action and the second action obtained in the step S201 are the same or similar, so as to judge whether the first action and the second action are associable with each other; and in response to that the feedback results are the same, it is judged that the first action and the second action are associable with each other (i.e., can be associated with each other), and in response to that the feedback results are different, it is judged that the first action and the second action are not associable with each other (i.e., cannot be associated with each other).

According to the embodiment of the present disclosure, whether the first action and the second action have the same function is determined by judging whether the feedback result of the first action and the feedback result of the second action are the same or similar, so that the actions with the same function have a logical relationship therebetween, and then in response to that the first device fails to execute the first action or the execution effect of the first action is relatively poor, the second device may be triggered to execute the second action to realize the same effect as that of the first action, and thus the robustness and the intelligence of the system are improved.

In some implementations, the step S202 may include: judging whether the execution result of the first action is the same as the execution result of the second action; in response to that the execution result of the first action is the same as the execution result of the second action, associating the first action with the second action; in response to that the execution result of the first action is not the same as the execution result of the second action, acquiring the execution effect of the first action and the execution effect of the second action, and judging whether the execution effect of the first action is the same as the execution effect of the second action, and in response to that the execution effect of the first action is the same as the execution effect of the second action, associating the first action with the second action. In the embodiment of the present disclosure, in response to that the first action and the second action can be directly determined to have the same function according to execution results, the first action and the second action are associated with each other (for example, the execution result of each of an intelligent cat eye and an intelligent camera is capturing an image, then functions of the intelligent cat eye and the intelligent camera are the same, and the intelligent cat eye and the intelligent camera can be associated with each other); and in response to that the first action and the second action cannot be directly determined to have the same function, execution effects of the first action and the second action are further acquired, and whether the first action and the second action have the same function is further judged according to the execution effects of the first action and the second action, and in response to that the first action and the second action have the same function, then the first action is associated with the second action. For example, execution results of an action of turning on a ventilation fan and an action of opening a window are that the ventilation fan is turned on and the window is opened, and the execution results of the action of turning on the ventilation fan and the action of opening the window are different, so that execution effects of the action of turning on the ventilation fan and the action of opening the window are to be further obtained, for example, both the execution effects of the action of turning on the ventilation fan and the action of opening the window are that the concentration of CO decreases, which indicates that the action of turning on the ventilation fan and the action of opening the window have the same function, and the action of turning on the ventilation fan and the action of opening the window can be associated with each other.

In some implementations, the acquiring the execution effect of the first action and the execution effect of the second action includes: acquiring an execution result of an action result object corresponding to the first action and an execution result of an action result object corresponding to the second action according to a preset acquisition interval and a preset acquisition mode (which includes acquiring once and periodically acquiring); and calculating to obtain the execution effect of the first action and the execution effect of the second action according to the execution result of the action result object corresponding to the first action and the execution result of the action result object corresponding to the second action. Execution results of the action result object corresponding to the first action and execution results of the action result object corresponding to the second action are continuously acquired according to the preset acquisition interval and the acquisition mode to obtain an execution result set of the action result object corresponding to the first action and an execution result set of the action result object corresponding to the second action, and calculating with the execution results in the execution result set of the action result object corresponding to the first action and the execution results in the execution result set of the action result object corresponding to the second action, so as to obtain the execution effect of the first action and the execution effect of the second action. For example, data of a CO sensor is continuously acquired, and it is found, by calculation, that each of execution effects of the first action and the second action is that the concentration of CO is reduced, which indicates that functions of the first action and the second action are the same.

In some implementations, the calculating, according to the execution result of the action result object corresponding to the first action and the execution result of the action result object corresponding to the second action, the execution effect of the first action and the execution effect of the second action includes: according to the execution result of the action result object corresponding to the first action and the execution result of the action result object corresponding to the second action, calculating result data corresponding to the first action and result data corresponding to the second action; and judging whether the result data corresponding to the first action and the result data corresponding to the second action meet a preset action condition, thereby obtaining the execution effect of the first action and the execution effect of the second action. For example, the preset action condition may include that: the indoor temperature is decreased to 20° C. or below within 5 minutes, or a rate of decreasing of the indoor temperature is greater than or equal to 5° C./min, or the indoor temperature is decreased to 23° C. or below, and in response to that the execution result of any action meets the preset action condition, the execution effect of the action is effective, and in response to that the execution result of any action does not meet the preset action condition, the execution effect of the action is ineffective. In response to that both the execution effect of the first action and the execution effect of the second action are effective, it indicates that the first action and the second action have the same function and can be associated with each other.

In some implementations, the associating the first action with the second action includes: judging, according to a preset association condition of the first action, whether the second action meets the association condition or not; and in response to that the second action meets the association condition, associating the first action with the second action. In the embodiment of the present disclosure, an optimized association result may be achieved by adding an association condition, so that association between a part of actions is limited. For example, interoperability between an air conditioner in a bedroom on a first floor and an air conditioner in a bedroom on a second floor is relatively poor, and a limitation may be made according to positions thereof, so that actions for triggering the air conditioner in the bedroom on the first floor and the air conditioner in the bedroom on the second floor cannot be associated with each other. In some implementations, the association condition includes at least one of a position of the device, a type of the device, an operation time, or an operation priority.

In some implementations, the associating the first action with the second action includes: associating the first action with the second action based on a preset mode for associating actions (i.e., associating the first action with the second action). In order to control executions of the first action and the second action, the preset mode for associating actions may be configured such that the first action and the second action are executed in a same mode. In some implementations, the preset mode for associating actions includes one of sequentially executing the actions, simultaneously executing the actions, or an abnormality of an action triggering an associated action to execute. In some implementations, in response to an abnormality of an action triggering an associated action to execute, an abnormality condition may be further configured (e.g., no action response is received within a period of time, or the execution effect does not reach an expected value within a period of time).

In order to implement the above embodiment of the present disclosure, oneM2M standard (i.e., internet of things standard) may be changed, for example, an attribute of actionEffect may added to <action>, this attribute can represent the execution effect of the action, an execution purpose of the action can be identified by determining the content of the attribute, the actions with the same actionEffect may be associated with each other, and after the actions are associated with each other, the triggering of the actions may be controlled according to different execution policies.

In some implementations, any or a combination of following attributes may be newly added in <action>:

an outputResourceID, for storing a resource identifier of the execution result;

an actionResult, for storing the execution result corresponding to the action and the execution result of the action result object;

an actionRelationEnable, which is a control button that determines whether an action can be associated with another action;

an actionEffect, which may be calculated by different policies;

a relatedActionID, which is a resource identifier of an action associated with the action;

an actionRelationCriteria, which indicates a criteria for associating actions, and may include association conditions such as a position of a device, a type of the device, an action time, and an action priority;

a relatedActionsRelationship, which indicates how the associated action is triggered to execute, including an action relationship indicating sequentially executing the actions, simultaneously executing the actions, an abnormality of an action triggering the associated action to execute, or the like; and a resultMode, which indicates a storing mode of the action result, includes a Retrieve Mode and a duration, and an actionResult may store a series of results of the action according to different result modes.

Figure 3:
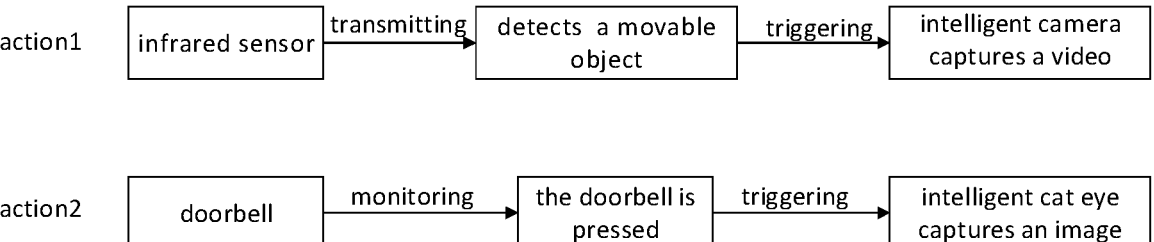
FIG. 3 is a schematic flowchart illustrating triggering of actions of an intelligent camera and an intelligent cat eye in a home security scene according to an embodiment of the present disclosure.

As shown in FIG. 3, two devices, namely an intelligent camera and an intelligent cat eye, and following actions (including a first action and a second action) exist in a home security scene.

In the first action, an infrared sensor detects whether a movable object appears, and in response to that the movable object appears, the intelligent camera is triggered to record a video.

In the second action, in response to that a doorbell being pressed by a person is monitored, the intelligent cat eye is triggered to capture an image.

In such scene, trigger conditions of the first action and the second action are completely different, but each of the execution results of the actions is storing multimedia image data of a target resource at a current moment. Therefore, the execution effect <actionEffect> in this scene should be determined through the execution result <actionResult>, and since the execution results are the same, the execution effects of the first action and the second action are the same, and the first action and the second action can be associated with each other. After the first action is associated with the second action, when one of the first action and the second action is failure, the other of the first action and the second action may be triggered.

Figure 4:
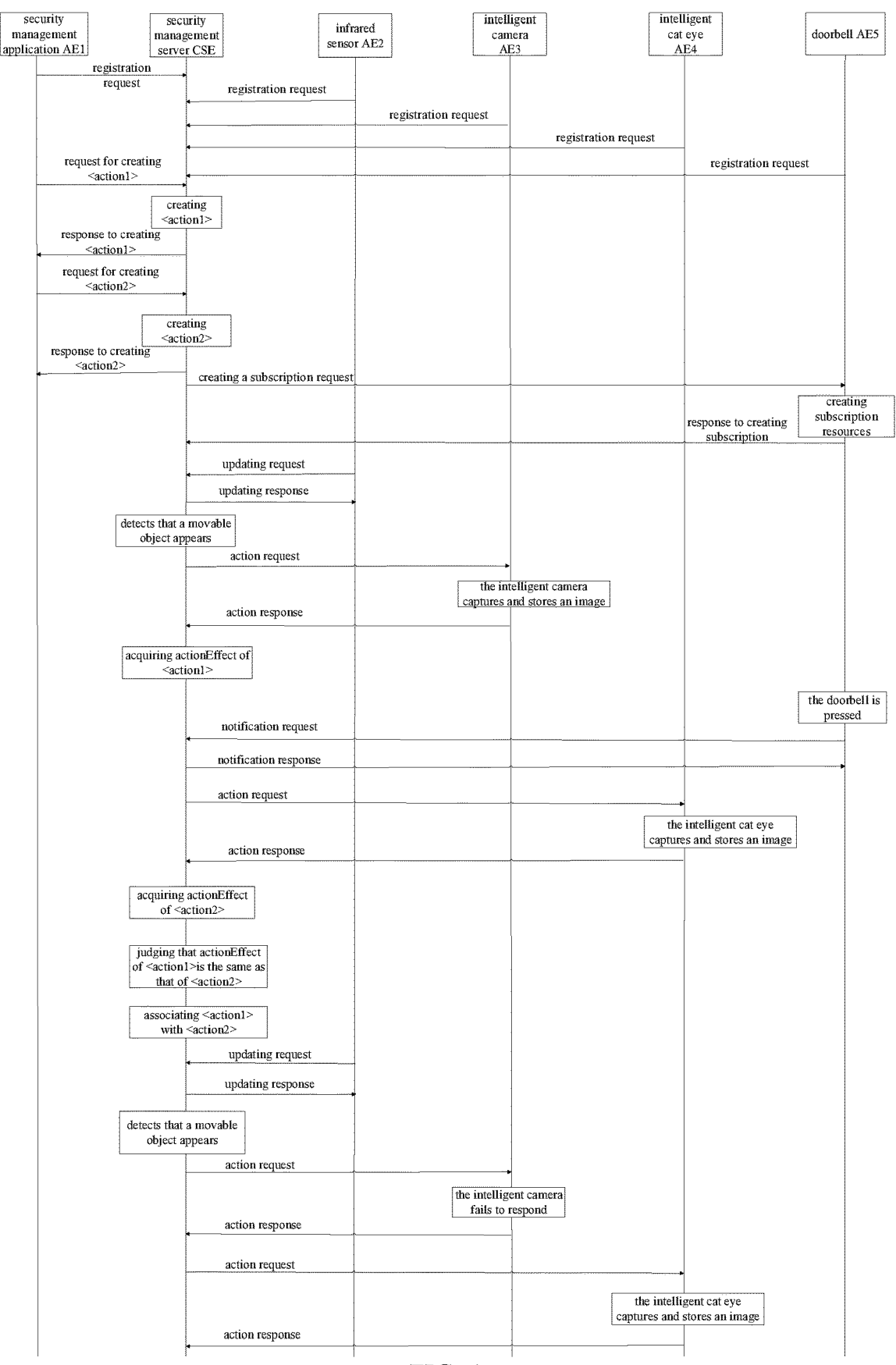
FIG. 4 is a schematic flowchart illustrating triggering and associating of actions of an intelligent camera and an intelligent cat eye in a home security scene according to an embodiment of the present disclosure.

The flow of triggering and associating the actions in such scene is shown in FIG. 4, and mainly includes following steps:

a security management application, an infrared sensor, an intelligent camera, an intelligent cat eye and a doorbell initiate registration requests to a security management server, and after registrations are completed, an <action1> of the intelligent camera and an <action2> of the intelligent cat eye are created on the security management server through the security management application;

the security management server initiates a subscription request to the doorbell, the doorbell creates a subscription resource, so that, in response to that a person presses the doorbell, the doorbell sends a notification request to the security management server, the security management server returns a notification response and sends an action request to the intelligent cat eye to trigger the intelligent cat eye to capture and store an image, then the intelligent cat eye returns an action response to the security management server, and the security management server obtains an execution result <actionResult> of the <action2> of the intelligent cat eye;

the infrared sensor detects whether a movable object appears in real time, and sends an execution result to the security management server, in response to that the infrared sensor detects an appearance of the movable object, the security management server sends an action request to the intelligent camera to trigger the intelligent camera to capture and store an image, then the intelligent camera returns an action response to the security management server, and the security management server obtains an execution result <actionResult> of the <action1> of the intelligent camera;

the security management server calculates <actionEffect> of the <action1> and <actionEffect> of the <action2> according to <actionResult> of the <action1> and <actionResult> of the <action2>, judges whether the <actionEffect> of the <action1> and the <actionEffect> of the <action2> are the same, and in response to that the <actionEffect> of the <action1> and the <action-Effect> of the <action2> are the same, associates the <action1> with the <action2>; and after the actions are associated, the infrared sensor continues to detect whether a movable object appears in real time and sends an execution result to the security management server, and in response to that the infrared sensor detects an appearance of the movable object, the security management server sends an action request to the intelligent camera to trigger the intelligent camera to capture and store an image, in response to that the security management server does not receive an action response returned by the intelligent camera within a period of time or receives a failure action response, it indicates that the <action1> of the intelligent camera fails to execute, the security management server sends an action request to the intelligent cat eye to trigger the intelligent cat eye to capture and store an image; correspondingly, in response to that a person presses the doorbell, the doorbell sends a notification request to the security management server, the security management server returns a notification response and sends an action request to the intelligent cat eye to trigger the intelligent cat eye to capture and store an image, in response to that the security management server does not receive the action response returned by the intelligent cat eye within a period of time or receives a failure action response, it indicates that the <action2> of the intelligent cat eye fails to execute, and then the security management server sends an action request to the intelligent camera to trigger the intelligent camera to capture and store an image.

Figure 5:
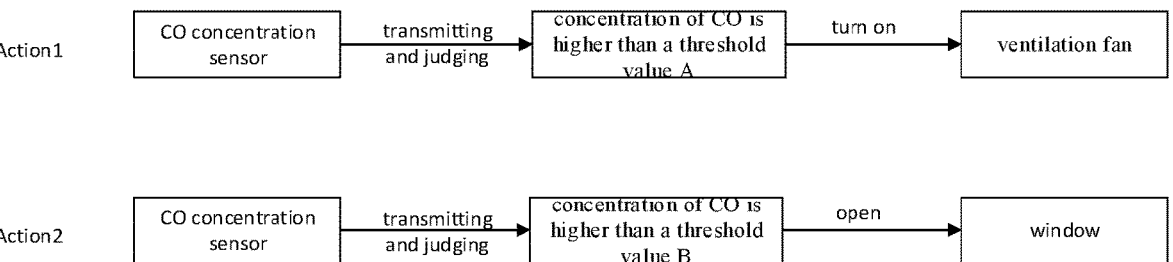
FIG. 5 is a schematic flowchart illustrating triggering of actions of a ventilation fan and a window in an intelligent home scene according to an embodiment of the present disclosure.

As shown in FIG. 5, two devices, namely a ventilation fan and a window, and following actions, including a first action and a second action, exist in an intelligent home scene.

In the first action, a CO concentration sensor detects whether a concentration of CO is higher than a threshold value A, and in response to that the concentration of CO is higher than the threshold value A, the ventilation fan is triggered to be turned on.

In the second action, the CO concentration sensor detects whether the concentration of CO is higher than a threshold value B, and in response to that the concentration of CO is higher than the threshold value B, the window is triggered to be opened.

In such scene, when the two actions allow to be associated with each other, the server may calculate an execution effect of each action by determining a trigger condition and an execution result of the action, and associate the two actions with each other in response to that execution effects of the two actions are the same.

The attribute <outputResourceID> in the <action1> may be the CO concentration sensor, it indicates that a target of the action is the concentration of CO in a space where the CO concentration sensor is located. By comparing the concentration of CO stored in <actionResult> with a threshold in the trigger condition, it is known that the action is intended to decrease the concentration of CO in the space where the CO concentration sensor is located, thus obtaining <actionEffect > of the <action1>. Similarly, it can be obtained that <actionEffect> of the <action2> is also decreasing the concentration of CO in the space, thus it is determined that the <action1> and the <action2> have the same <actionEffect>, and the <action1> and the <action2> can be associated with each other. After the <action1> is associated with the <action2>, in response to that the <action1> fails to execute, the <action2> is triggered to execute.

Figure 6:
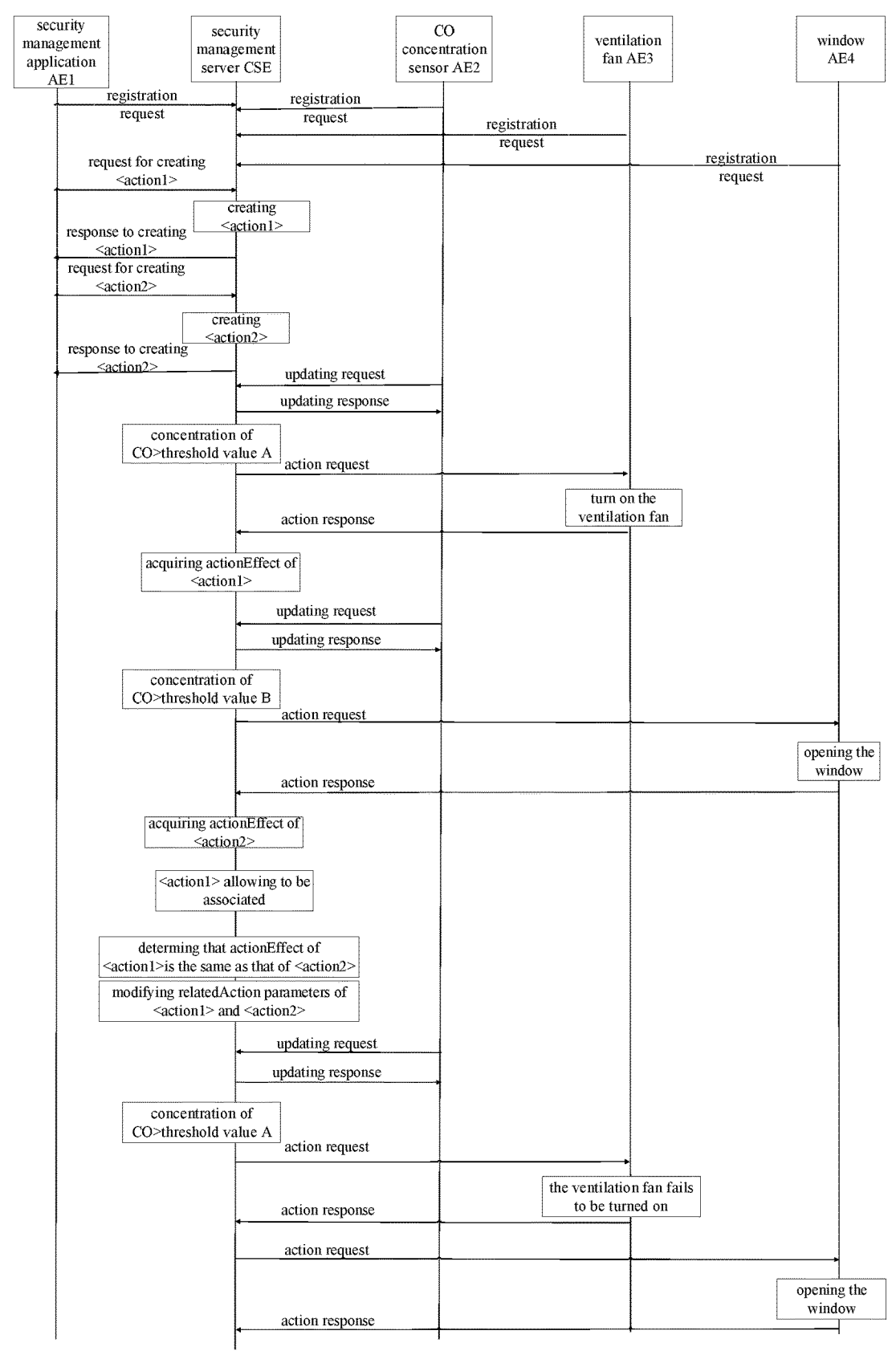
FIG. 6 is a schematic flowchart illustrating triggering and associating of actions of a ventilation fan and a window in an intelligent home scene according to an embodiment of the present disclosure.

The flow of triggering and associating the actions in such scene is shown in FIG. 6, and mainly includes following steps:

a security management application, a CO concentration sensor, a ventilation fan and a window initiate registration requests to a security management server, and after registrations are completed, an <action1> of the ventilation fan and an <action2> of the window are created on the security management server by the security management application;

the CO concentration sensor detects an indoor concentration of CO in real time and sends an execution result to the security management server, in response to that the indoor concentration of CO is larger than a threshold value A, the security management server sends an action request to the ventilation fan to trigger the ventilation fan to be turned on, the CO concentration sensor continues to detect the indoor concentration of CO and stores the execution result in <actionResult> of the <action1>, and in response to that the indoor concentration of CO is larger than a threshold value B, the security management server sends an action request to the window to trigger the window to be opened, the CO concentration sensor continues to detect the indoor concentration of CO and stores the execution result in <actionResult> of the <action2>;

the security management server calculates <actionEffect> of the <action1> and <actionEffect> of the <action2> according to the <actionResult> of the <action1> and the <actionResult> of the <action2>, determines whether the <actionEffect> of the <action1> is the same as the <actionEffect> of the <action2>, in response to that the <actionEffect> of the <action1> is the same as the <actionEffect> of the <action2>, modifies <relatedActionID> of each of the <action1> and the <action2> to associate the two actions with each other, in such example, each of the <actionEffect> of the <action1> and the <actionEffect> of the <action2> is decreasing the concentration of CO in the space where the CO concentration sensor is located, and thus the <action1> and the <action2> can be associated with each other;

after the actions are associated, the CO concentration sensor continues to detect the indoor concentration of CO in real time and sends an execution result to the security management server, in response to that the indoor concentration of CO is greater than the threshold value A, the security management server sends an action request to the ventilation fan to trigger the ventilation fan to be turned on, and in response to that the security management server does not receive an action response returned by the ventilation fan within a period of time or receives a failure action response, it indicates that the <action1> of the ventilation fan fails to execute, then the security management server sends an action request to the window to trigger the window to be opened; correspondingly, in response to that the indoor concentration of CO is greater than the threshold value B, the security management server sends an action request to the window to trigger the window to be opened, and in response to that the security management server does not receive an action response returned by the window within a period of time or receives a failure action response, it indicates that the <action2> of the window fails to execute, then the security management server sends an action request to the ventilation fan to trigger the ventilation fan to be turned on.

Figure 7:
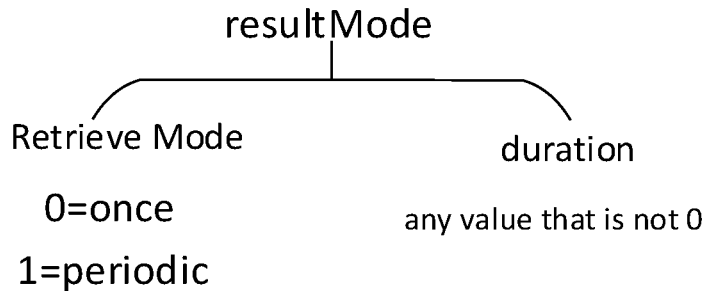
FIG. 7 is a structural diagram of an attribute <resultMode> according to an embodiment of the present disclosure.

In the process of implementing the present disclosure, it is found that the execution result of the action cannot be sufficiently represented at an instant of executing the action, and the <actionResult> in current action trigger mechanism only represents the content of the action result at a time that the action is triggered, and cannot show subsequent changes of the action result, and may affect the calculation of the <actionEffect>, thus a method for improving <action> resources is proposed in the embodiment of the present disclosure. In some implementations, an attribute <resultMode> is added to the <action>, which may determine a mode of a retrieve (detection) operation and thus decide to store different contents of the action result in the execution result <actionResult>, and is configured as shown in FIG. 7.

In response to that the Retrieve Mode is set to once (which may be denoted by "0"), a retrieve operation is performed only once, a time interval between performing retrieve operations is determined by <duration> in the attribute, and a result of the retrieve operation is stored in the <actionResult>.

In response to that the Retrieve Mode is set to periodic (which may be denoted by "1"), a plurality of retrieve operations are periodically performed, the time interval between performing the retrieve operations is determined by the <duration>, and respective results of the retrieve operations are stored in the <actionResult>.

It should be noted that the duration should be a value other than 0, and in response to that the duration takes a value of 0, no selection operation is performed for the resultMode.

Figure 8:
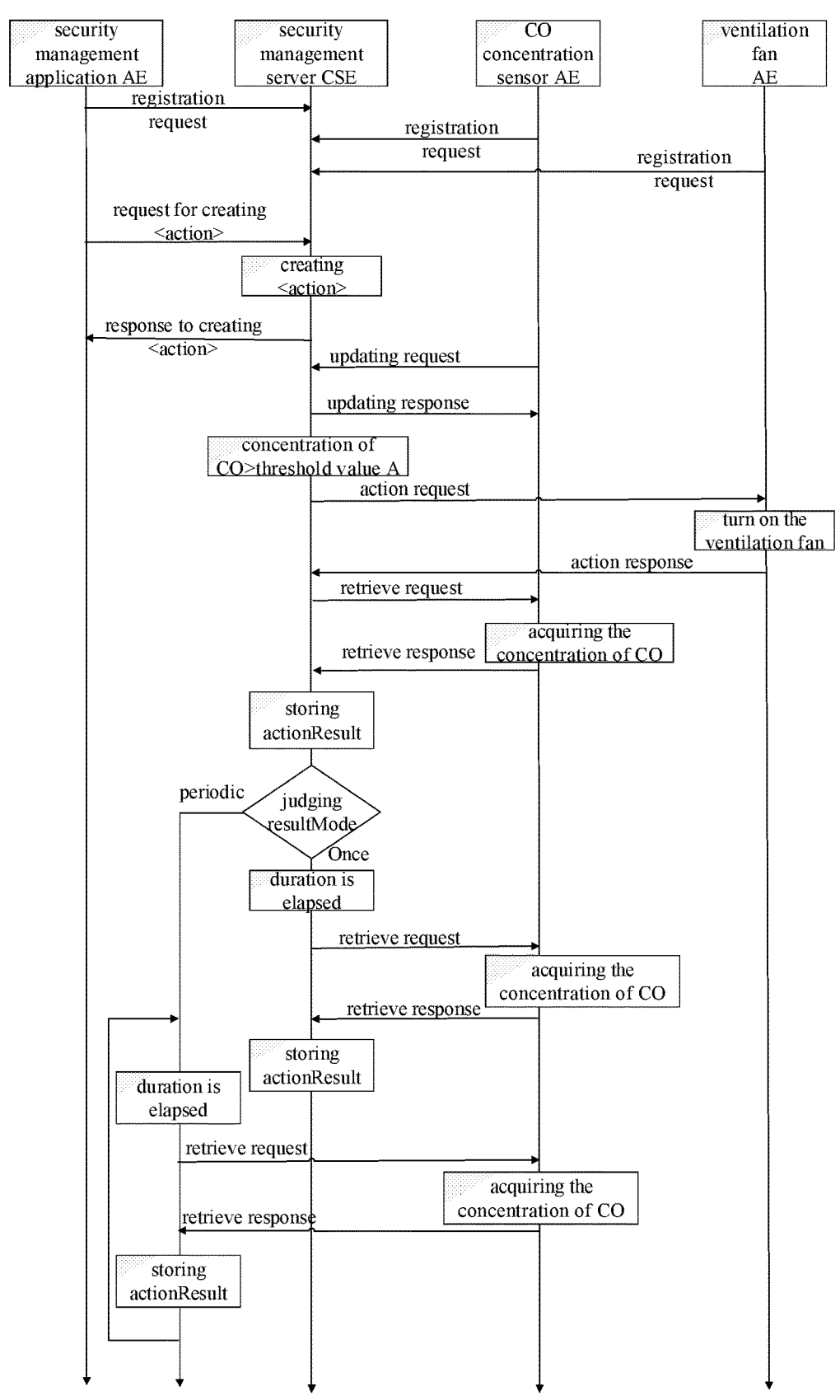
FIG. 8 is a schematic flowchart of executing a Retrieve operation in an embodiment of the present disclosure.

In such scene, for the <actionResult> in the <action1> in FIG. 5, an execution flow is as shown in FIG. 8, and mainly includes following steps:

the security management application, the CO concentration sensor and the ventilation fan initiate registration requests to the security management server, and after registrations are completed, an <action> of the ventilation fan is created on the security management server by the security management application;

the CO concentration sensor detects an indoor concentration of CO in real time, and sends an execution result to the security management server, in response to that the indoor concentration of CO is larger than the threshold value A, the security management server sends an action request to the ventilation fan to trigger the ventilation fan to be turned on;

the security management server sends a Retrieve request to the CO concentration sensor, the CO concentration sensor returns a Retrieve response (carrying the concentration of CO) to the security management server, the security management server stores the obtained concentration of CO in the <actionResult>, then the security management server judges whether the Retrieve Mode in the resultMode is once or periodic, in response to that the Retrieve Mode is the once, after a preset time interval <duration> elapses, the retrieve operation is performed only once, the operation result (i.e., the concentration of CO) is stored in the <actionResult>, and in response to that the Retrieve Mode is the periodic, the retrieve operation is performed periodically after every lapse of the preset time interval <duration>, and each operation result (i.e., the concentration of CO) is stored in the <actionResult>.

Figure 9:
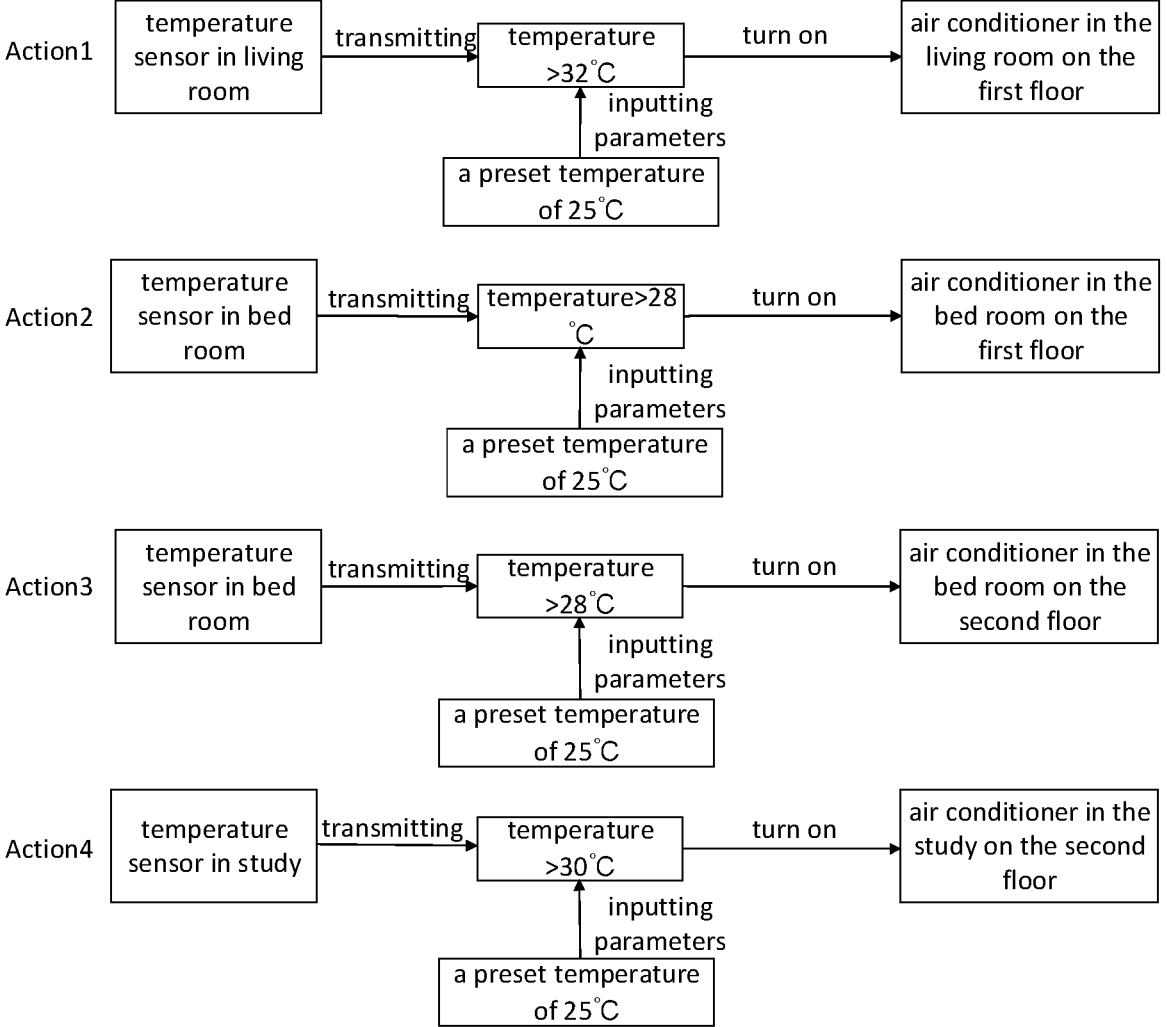
FIG. 9 is a schematic flowchart illustrating triggering of actions of a plurality of air conditioners in an intelligent home scene according to an embodiment of the present disclosure.

A plurality of actions may be created in the intelligent home scene, as shown in FIG. 9, taking four actions as an example, temperatures in different spaces are detected through different sensors, thus corresponding air conditioners are triggered to be turned on, which is similar to the foregoing and is not described again.

Figure 10:
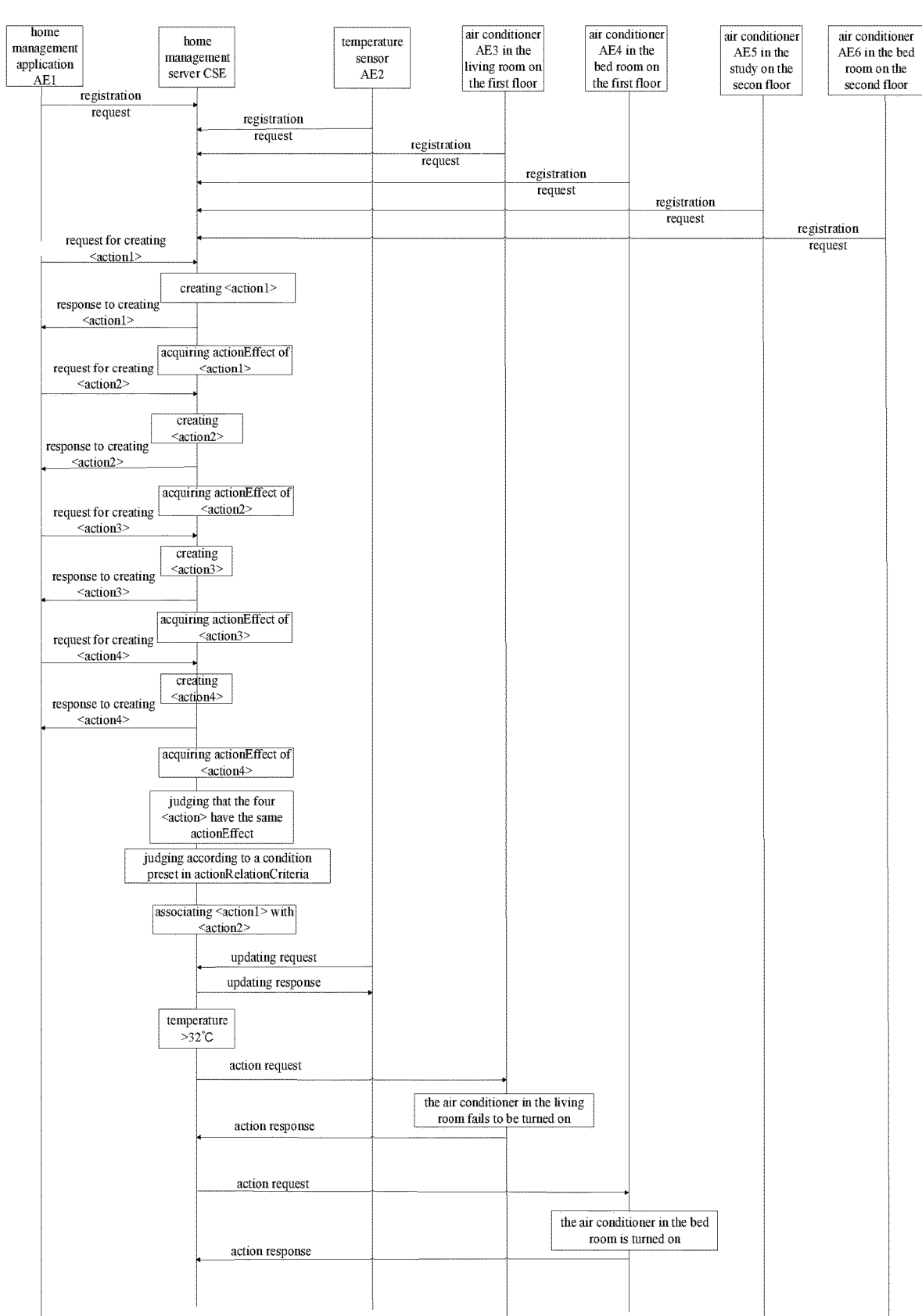
FIG. 10 is a schematic flowchart illustrating triggering and associating of actions of a plurality of air conditioners in an intelligent home scene according to an embodiment of the present disclosure.

The flow of triggering and associating the actions in such scene is shown in FIG. 10, it can be seen that temperature thresholds (32° C., 28° C., 28° C. and 30° C.) for triggering the four actions are all higher than a preset temperature (25° C.), and since four attributes are all temperatures, and by comparing values, each of the four actions can realize a function of reducing the temperature, the four actions have the same execution effect. However, since the first floor and the second floor have a relatively poor interoperability, a relatively poor association result may be resulted in in a case where the four actions are associated with each other, in such case, the association result may be optimized by limiting association between part of actions through an association condition <actionRelationCriterion>. As an example, the <action1> may be associated with the <action2>, and an <action3> may be associated with an <action4>.

After the actions are associated, in order to control executions of the actions, execution modes such as simultaneously executing the actions, sequentially executing the actions, or an abnormality of a first action triggering a second action associated with the first action to execute may be realized by setting a mode <relatedActionsRelationship> for associating actions. In response to that simultaneously executing the actions is set, the execution flow after the actions are associated is as shown in FIG. 11; in response to that an abnormality of a first action triggering a second action associated with the first action to execute is set, the execution flow after the actions are associated is as shown in FIG. 12.

Figure 11:
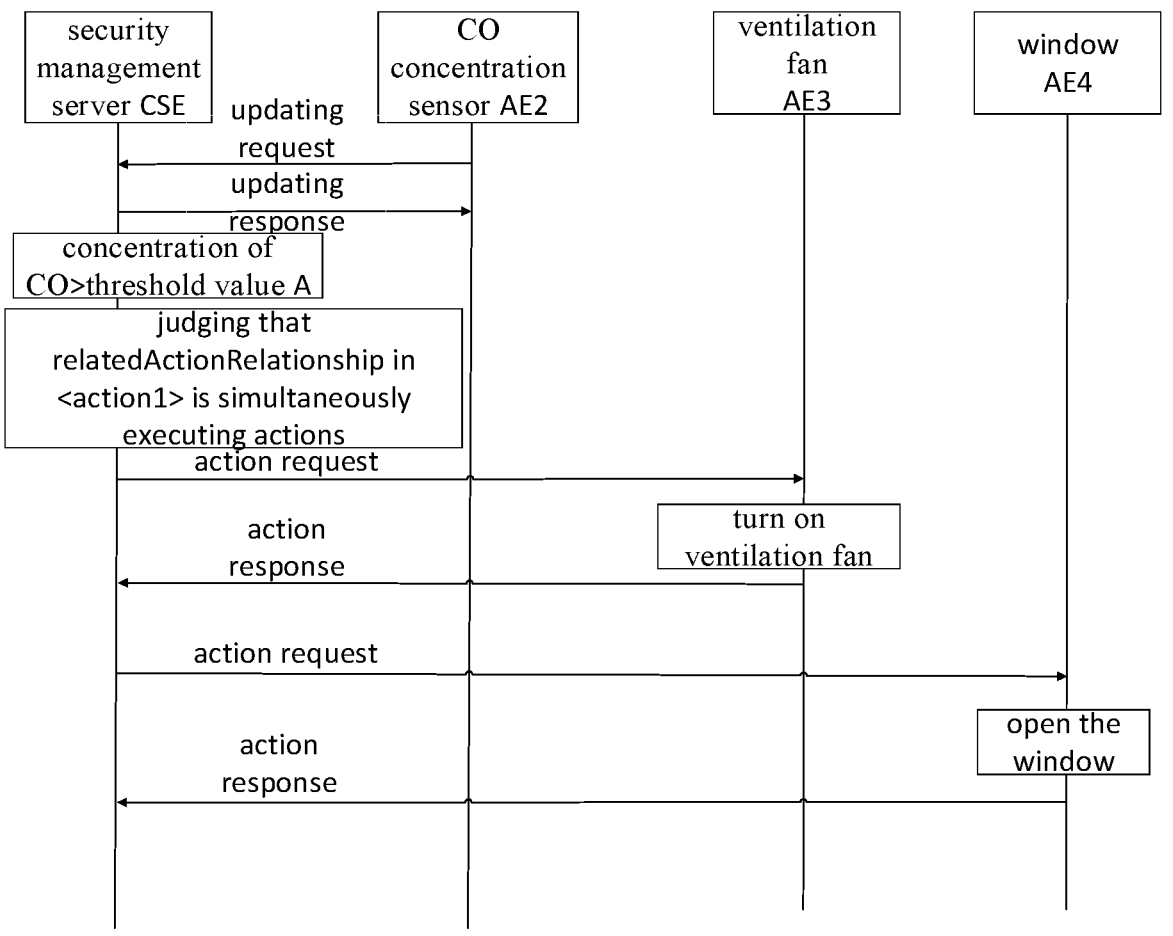
FIG. 11 is a schematic flowchart illustrating triggering multiple actions to execute simultaneously according to an embodiment of the present disclosure.
Figure 12:
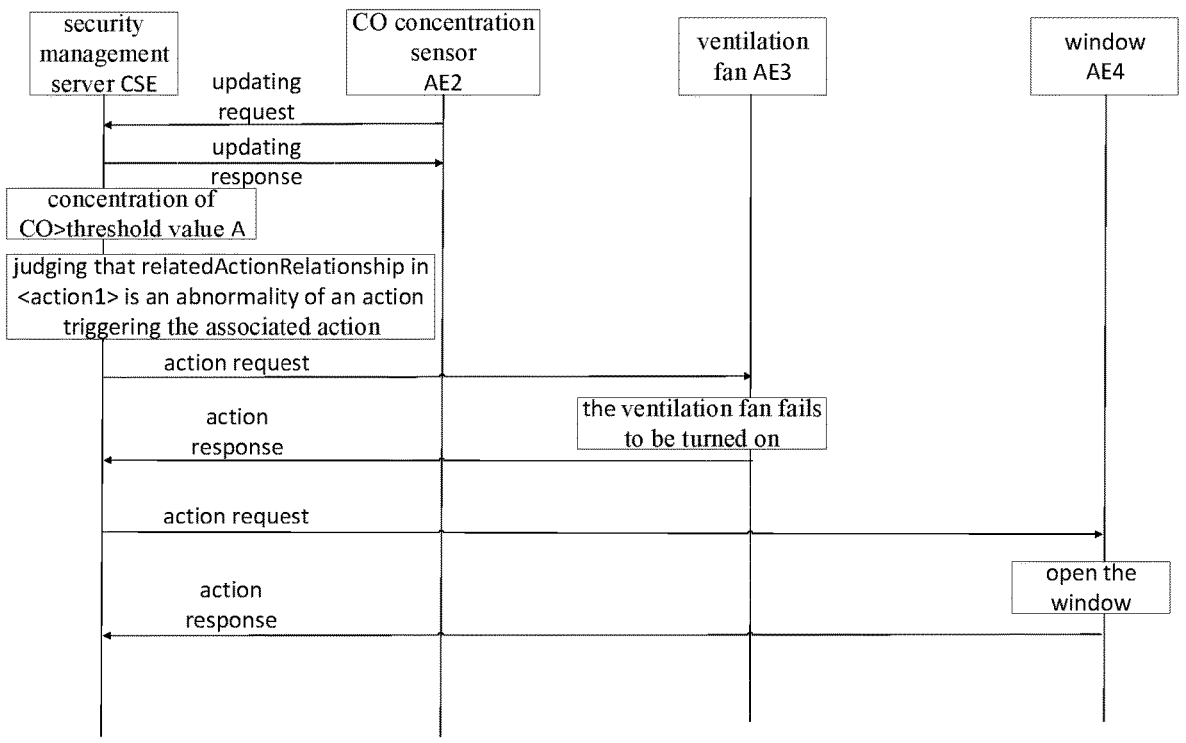
FIG. 12 is a schematic flowchart illustrating an abnormality of an action triggering an associated action to execute according to an embodiment of the present disclosure.

As shown in FIG. 11, in response to that the mode for associating actions is simultaneously executing the actions, the first action and the second action are triggered simultaneously; as shown in FIG. 12, in response to that the mode for associating actions is an abnormality of a first action triggering a second action associated with the first action to execute, the second action is triggered to execute in response to that the first action fails to execute.

It should be noted that the method of the embodiment of the present disclosure may be performed by a single device, such as a computer or a server. The method of the embodiment of the present disclosure may also be applied to a distributed scene and is completed by mutual cooperation of a plurality of devices. In such a distributed scene, each of the devices may only perform one or more steps of the method of the embodiment of the present disclosure, and the devices interact with each other to complete the method.

Figure 13:
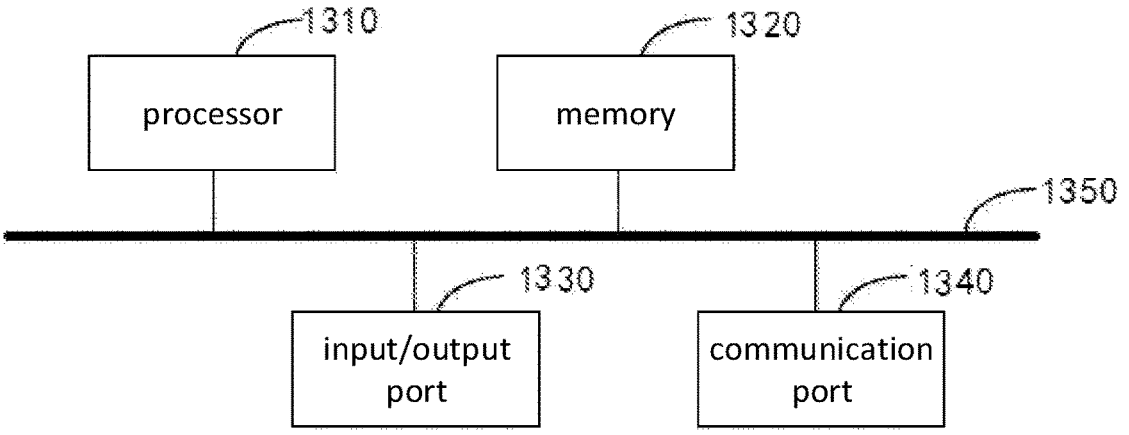
FIG. 13 is a schematic diagram of internal structures of an electronic device according to an embodiment of the present disclosure.

FIG. 13 is a schematic diagram illustrating a hardware structure of an electronic device in an embodiment of the present disclosure. The electronic device may include: a processor 1310, a memory 1320, an input/output interface 1330, a communication interface 1340, and a bus 1350. The processor 1310, the memory 1320, the input/output interface 1330, and the communication interface 1340 are communicably connected with each other via the bus 1350 within the electronic device.

The processor 1310 may be implemented by a general-purpose CPU (Central Processing Unit), a microprocessor, an Application Specific Integrated Circuit (ASIC), or one or more Integrated Circuits, and is configured to execute a related program to implement the technical solution provided in the embodiment of the present disclosure. The processor 1310, when executing the program, implements the method as described in the embodiment described above.

In some implementations, the processor 1310 may load and execute: triggering a first device to execute a first action, and triggering a second device to execute a second action to obtain a feedback result of the first action and a feedback result of the second action, where the feedback result includes at least one of an execution result or an execution effect; judging whether the first action and the second action are associable with each other based on the feedback result of the first action and the feedback result of the second action; and associating the first action with the second action in response to that the first action and the second action are associable with each other.

In some implementations, the processor 1310 may load and execute:

judging whether the execution result of the first action is the same as the execution result of the second action;

in response to that the execution result of the first action is the same as the execution result of the second action, associating the first action with the second action;

in response to that the execution result of the first action is different from the execution result of the second action, acquiring the execution effect of the first action and the execution effect of the second action; judging whether the execution effect of the first action is the same as the execution effect of the second action, and in response to that the execution effect of the first action is the same as the execution effect of the second action, associating the first action with the second action.

In some implementations, the processor 1310 may load and execute:

acquiring a detection result of a detection object corresponding to the first action and a detection result of a detection object corresponding to the second action according to a preset acquisition period and a preset number of acquisition times;

analyzing the detection result of the detection object corresponding to the first action and the detection result of the detection object corresponding to the second action, thereby obtaining an execution effect of the first action and an execution effect of the second action.

In some implementations, the processor 1310 may load and execute:

analyzing the detection result of the detection object corresponding to the first action and the detection result of the detection object corresponding to the second action in combination with a preset action condition, thereby obtaining the execution effect of the first action and the execution effect of the second action.

In some implementations, the processor 1310 may load and execute:

judging whether the second action meets a preset association condition of the first action or not according to the association condition;

in response to that the second action meets the association condition, associating the first action with the second action.

In some implementations, the association condition includes at least one of a position of the device, a type of the device, an operation time, or an operation priority.

In some implementations, the processor 1310 may load and execute:

associating the first action with the second action based on a preset association relationship between the first action and the second action.

In some implementations, the association relationship (i.e., the mode for associating actions) includes one of sequentially executing the actions, simultaneously executing the actions, or an abnormality of an action triggering an associated action to execute.

The memory 1320 may be implemented in the form of a ROM (Read Only Memory), a RAM (Random Access Memory), a static memory device, a dynamic memory device, or the like. The memory 1320 may store an operating system and other application programs, and for implementing the technical solution provided by the embodiment of the present disclosure by software or firmware, the relevant program codes are stored in the memory 1320 and called by the processor 1310 to be executed. The memory 1320 is used for storing data, and the data includes at least one of an acquisition interval, an acquisition mode, an execution result, an execution effect, result data, an action condition, an association condition, or a mode for associating actions.

The input/output interface 1330 is configured to be connected with an input/output module for inputting and outputting information. The input/output module may be configured as a component in the electronic device, or may be externally connected to the electronic device to provide corresponding functions. The input module may include a keyboard, a mouse, a touch screen, a microphone, various sensors, or the like, and the output module may include a display, a speaker, a vibrator, an indicator light, or the like.

The communication interface 1340 is configured to be connected with a communication module (not shown in the drawings) to implement communication interaction between the electronic device and other devices. The communication module may realize communication in a wired mode (for example, through a USB, a network cable or the like), or may realize communication in a wireless mode (for example, through a mobile network, a WIFI, a Bluetooth or the like).

The bus 1350 includes a path for transmitting information between various components (such as the processor 1310, the memory 1320, the input/output interface 1330, and the communication interface 1340) of the electronic device.

It should be noted that although the electronic device only shows the processor 1310, the memory 1320, the input/output interface 1330, the communication interface 1340, and the bus 1350, in some implementations, the electronic device may further include other components necessary for proper operation. In addition, those skilled in the art will appreciate that the electronic device may include only components necessary for implementing the embodiment of the present disclosure, and not include all components shown in the drawings.

A computer-readable storage medium in an embodiment of the present disclosure includes permanent and non-permanent, removable and non-removable medium, and may implement information storage by any method or technology. The information may be computer readable instructions, data structures, program modules or other data. Examples of the computer-readable storage medium include, but not limited to, phase change memory (PRAM), Static Random Access Memory (SRAM), Dynamic Random Access Memory (DRAM), other types of Random Access Memory (RAM), Read Only Memory (ROM), Electrically Erasable Programmable Read Only Memory (EEPROM), flash memory or other memory technology, Compact Disc Read Only Memory (CD-ROM), Digital Versatile Disks (DVD) or other optical storage, magnetic cassettes, magnetic disk storage or other magnetic storage devices, or any other non-transmission medium, for storing information which can be accessed by a computing device.

Those of ordinary skill in the art should understand that the discussion of any of above embodiments is only exemplary and is not intended to imply that the scope of the present disclosure (including claims) is limited to these examples. With the concept of the present disclosure, technical features in any embodiment or in different embodiments may be combined arbitrarily, and the steps may be implemented in different orders. There are many other changes in different aspects of the present disclosure as described above, and for simplicity, such changes are not provided in details here.

In addition, in order to simplify description and discussion, and not to make the present disclosure difficult to be understood, well-known power/ground connections with an integrated circuit (IC) chip and other components may be shown or may not be shown in the drawings provided. In addition, an apparatus may be shown in the form of a block diagram in order to avoid making the present disclosure difficult to be understood, and it also takes into account the fact that details of implementations of the apparatus shown by the block diagram are highly dependent on the platform on which the present disclosure is to be implemented (that is, the details should be within a range understood by those skilled in the art). In a case where details (e.g., processes) are set forth to describe exemplary embodiments of the present disclosure, it will be apparent to those skilled in the art that the present disclosure may be implemented without these details or with changes in these details. Therefore, the description should be considered illustrative rather than restrictive.

The present disclosure has been described in conjunction with embodiments thereof, many alternatives, modifications, and variations thereof will be apparent to those skilled in the art in light of the foregoing description.

The embodiments of the present disclosure are intended to embrace all such alternatives, modifications and variances that fall within the broad scope of the appended claims. Therefore, any omissions, modifications, equivalents, improvements, and the like that may be made without departing from the spirit or scope of the present disclosure are intended to be included within the scope of the present disclosure.

The invention claimed is:

1. A method for associating actions for Internet of things, comprising:

triggering a first device to execute a first action, and triggering a second device to execute a second action to obtain a feedback result of the first action and a feedback result of the second action, wherein each feedback result comprises at least one of an execution result or an execution effect; and judging whether the first action and the second action are associable with each other based on the feedback result of the first action and the feedback result of the second action; and in response to that the first action and the second action are associable with each other, associating the first action with the second action, wherein the associating the first action with the second action comprises:

associating the first action with the second action based on a preset mode for associating actions, wherein the preset mode for associating actions comprises, in response to that the first action fails to execute or the execution effect of the first action fails to reach an expected value within a period of time, to execute the second action to realize an execution effect the same as the execution effect of the first action reaching the expected value.

2. The method of claim 1, wherein the judging whether the first action and the second action are associable with each other based on the feedback result of the first action and the feedback result of the second action; and in response to that the first action and the second action are associable with each other, associating the first action with the second action comprises:

judging whether the execution result of the first action is the same as the execution result of the second action;

in response to that the execution result of the first action is the same as the execution result of the second action, associating the first action with the second action; and in response to that the execution result of the first action is different from the execution result of the second action, acquiring the execution effect of the first action and the execution effect of the second action, and judging whether the execution effect of the first action is the same as the execution effect of the second action; and in response to that the execution effect of the first action is the same as the execution effect of the second action, associating the first action with the second action.

3. The method of claim 2, wherein the acquiring the execution effect of the first action and the execution effect of the second action comprises:

acquiring an execution result of an action result object corresponding to the first action and an execution result of an action result object corresponding to the second action according to a preset acquisition interval and an acquisition mode; and calculating to obtain the execution effect of the first action and the execution effect of the second action according to the execution result of the action result object corresponding to the first action and the execution result of the action result object corresponding to the second action.

4. The method of claim 3, wherein the calculating to obtain the execution effect of the first action and the execution effect of the second action according to the execution result of the action result object corresponding to the first action and the execution result of the action result object corresponding to the second action comprises:

calculating result data corresponding to the first action and result data corresponding to the second action according to the execution result of the action result object corresponding to the first action and the execution result of the action result object corresponding to the second action; and judging whether the result data corresponding to the first action and the result data corresponding to the second action meet a preset action condition, so as to obtain the execution effect of the first action and the execution effect of the second action.

5. The method of claim 1, wherein the associating the first action with the second action comprises:

judging whether the second action meets a preset association condition of the first action according to the preset association condition; and in response to that the second action meets the preset association condition, associating the first action with the second action.

6. The method of claim 5, wherein the preset association condition comprises at least one of a position of a device, a type of the device, an operation time, or an operation priority.

7. The method of claim 1, wherein the method for associating actions for Internet of things is applied to a server.

8. An electronic device, comprising a memory, a processor and a computer program stored in the memory and being executable on the processor, the computer program, executed by the processor, causes the processor to carry out the method of claim 1, the memory is configured to store data comprising at least one of an acquisition interval, an acquisition mode, an execution result, an execution effect, result data, an action condition, an association condition or a mode for associating actions.

9. A non-transitory computer-readable storage medium having stored thereon computer instructions, the computer instructions, executed by a computer, cause the computer to carry out the method of claim 1.

10. The electronic device of claim 8, wherein the processor is configured to:

judge whether the execution result of the first action is the same as the execution result of the second action;

in response to that the execution result of the first action is the same as the execution result of the second action, associate the first action with the second action; and in response to that the execution result of the first action is different from the execution result of the second action, acquire the execution effect of the first action and the execution effect of the second action, and judge whether the execution effect of the first action is the same as the execution effect of the second action; and in response to that the execution effect of the first action is the same as the execution effect of the second action, associate the first action with the second action.

11. The electronic device of claim 10, wherein the processor is configured to:

acquire an execution result of an action result object corresponding to the first action and an execution result of an action result object corresponding to the second action according to a preset acquisition interval and an acquisition mode; and calculate to obtain the execution effect of the first action and the execution effect of the second action according to the execution result of the action result object corresponding to the first action and the execution result of the action result object corresponding to the second action.

12. The electronic device of claim 11, wherein the processor is configured to:

calculate result data corresponding to the first action and result data corresponding to the second action according to the execution result of the action result object corresponding to the first action and the execution result of the action result object corresponding to the second action; and judge whether the result data corresponding to the first action and the result data corresponding to the second action meet a preset action condition, so as to obtain the execution effect of the first action and the execution effect of the second action.

13. The electronic device of claim 8, wherein the processor is configured to:

judge whether the second action meets a preset association condition of the first action according to the preset association condition; and in response to that the second action meets the preset association condition, associate the first action with the second action.

14. The electronic device of claim 13, wherein the preset association condition comprises at least one of a position of a device, a type of the device, an operation time, or an operation priority.

15. The electronic device of claim 8, wherein the electronic device is applied to a server.

* * * * *